United States Patent
Weakland et al.

[11] Patent Number: 6,108,871
[45] Date of Patent: Aug. 29, 2000

[54] REMOVABLE STEERING WHEEL KNOB AND BASE

[75] Inventors: Lonny E. Weakland, Douglasville, Ga.; Timothy R. Smith, Commerce, Mich.

[73] Assignee: Altair Engineering, Inc., Troy, Mich.

[21] Appl. No.: 09/137,999

[22] Filed: Aug. 26, 1998

[51] Int. Cl.[7] .................................................. E05B 1/00
[52] U.S. Cl. ............................ 16/441; 16/422; 285/311; 74/552
[58] Field of Search ...................... 16/441, 422; 403/321, 403/322; 74/552; 294/58; 285/311

[56] References Cited

U.S. PATENT DOCUMENTS

| | | |
|---|---|---|
| 2,305,527 | 12/1942 | Hassett . |
| 2,425,055 | 8/1947 | Taylor . |
| 2,437,575 | 3/1948 | White . |
| 2,482,641 | 9/1949 | Stites . |
| 2,549,774 | 4/1951 | Chambers . |
| 2,579,165 | 12/1951 | Woodruff . |
| 2,592,413 | 4/1952 | Garfield . |
| 2,716,903 | 9/1955 | Hansen . |
| 2,729,116 | 1/1956 | Arnold . |
| 2,932,982 | 4/1960 | Enders . |
| 3,206,230 | 9/1965 | Weinhold ................................ 285/311 |
| 3,282,124 | 11/1966 | Peterson . |
| 3,341,235 | 9/1967 | Mattson .................................. 74/552 |
| 3,554,052 | 1/1971 | Mross . |
| 3,776,064 | 12/1973 | Rose . |
| 4,225,104 | 9/1980 | Larson ..................................... 16/441 |
| 4,705,305 | 11/1987 | Ghaly ..................................... 285/311 |
| 4,881,294 | 11/1989 | Riedl ....................................... 16/441 |
| 5,007,301 | 4/1991 | Powell . |
| 5,289,736 | 3/1994 | Fujimori . |
| 5,870,800 | 2/1999 | Chao ....................................... 16/441 |

FOREIGN PATENT DOCUMENTS

| | | |
|---|---|---|
| 59-36518 | of 1984 | Japan . |
| 602-403 | of 1977 | Switzerland . |

*Primary Examiner*—Anthony Knight
*Assistant Examiner*—Mark Williams
*Attorney, Agent, or Firm*—Young & Basile, P.C.

[57] ABSTRACT

An apparatus in connectible to a steering wheel for aiding disabled drivers. The apparatus includes a base having a first part and a second part for moving with a respect to one another. The base defines a steering-wheel-receiving aperture between the first and second parts for allowing the base to substantially sheath a portion of the steering wheel. A hinge connection is formed between the first and second parts of the base allowing pivotal movement with respect to one another. The hinge connection is formed along a common edge portion of the first and second parts for allowing placement of the base with respect to the steering wheel. A latch releasibly retains the first and second parts of the base with respect to one another. The latch is connected to the first and second parts opposite from the hinge axis. A knob is connected to the base for gripping by the driver with one hand for controlling movement of the steering wheel when the base is attached to the steering wheel. Preferably, the knob is releasible connected to the base. A locking member operably engages with a stem connected to the knob in order to retain the knob in a locked position with respect to the base. The locking member allows removal of the stem and connected knob from the base when selectively moved from the locked position to a release position.

15 Claims, 3 Drawing Sheets

REMOVABLE STEERING WHEEL KNOB AND BASE

FIELD OF THE INVENTION

The present invention relates to a knob and base that can be removably attached to a steering wheel, and more particularly, to a steering wheel knob and base that allows disabled individuals to install and remove the device from a steering wheel of any vehicle.

BACKGROUND OF THE INVENTION

Current steering knob base designs for disabled drivers are configured in one of two ways. Both designs greatly restrict the user's freedom by allowing disabled persons to drive only specially equipped vehicles because of the permanent nature of the base systems.

The first style of mounting system consists of a base and one or two bands that wrap around the steering wheel. To install this type of device, the base must be held against the steering wheel while the bands are located and properly tightened around the steering wheel rim. This type of device usually needs to be installed by a professional with the aid of two hands and tools. This style of attachment usually damages the cover of the steering wheel rim.

The second mounting system is designed to span the inside diameter of the steering wheel. This device is adjusted by rotating a threaded rod to the proper length. Since this style of steering device spans across the steering wheel it interferes with air bag deployment. This style will not work on steering wheels in which the center portion of the wheel is raised and interferes with the device.

SUMMARY OF THE INVENTION

The present invention is structured toward increasing the freedom of disabled individuals that are required to use a steering aid device by allowing disabled individuals to remove the device quickly and easily move the device from one vehicle to vehicle. One particular application of this device would be to aid in driving an automobile. The device according to the present invention can be moved from one vehicle to another by simple depressing a plunger and removing a primary steering pin. In most cases, this removal can be achieved using one hand. Once this is removed, the user can pull up on a handle allowing a bail member to be rotated from a latched position to released position to remove the device from the wheel rim. In most cases, this release can also be achieved using one hand. By reversing this process, the device according to the present invention can be attached to the next vehicle.

The present invention provides a steering knob system for disabled drivers which is easily installed and removed from one vehicle to another without tools. The steering knob system includes a hinged base design that wraps around the steering wheel and is held by an integrated clamping mechanism. The clamping mechanism includes a handle with an integrated cam, a tension strap or bail, and a steering knob base. The hinged base includes two portions capable of being substantially wrapped around the steering wheel and held in position while the tension strap or bail member is located in an appropriate locking groove or tooth on an opposing portion of the hinged base. The tension strap or bail member is held in position when the handle is pivoted about a fixed axis in order to apply tension to the strap to hold the two portions of the hinged base in gripping contact with the steering wheel rim. The steering knob device is removed by reversing this operation. The hinged base can be attached and detached from the steering wheel as desired, and preferably the attachment and detachment can be achieved using only one hand. The curvature designed into the hinged base allows accommodation of most known existing automotive steering wheels.

The present invention can include a base having two parts moveable with respect to one another for defining an arcuate rim-receiving passage therebetween. Hinge means can be provided for pivotally connecting the first and second parts of the base with respect to one another along a portion thereof. A hand grip or knob can be permanently, or releasably connected to the base. If a releasable connection is desired, the knob can include an outwardly extending stem receivable within a complementary aperture within the base. Release means can be provided for releasably locking the stem and connected knob with respect to the base. The release means can include a push button connected to an enlarged periphery engagable with a recessed portion of the stem for holding the stem in a predefined position. The push button has a reduced periphery allowing passage of the stem when moved to the release position. Latch means can be provided opposite from the hinge means for releasable holding the first and second parts of the base with respect to one another. The latch means can include a pivotal bail connected to a lever. The lever is pivotally mounted to one part of the base. The opposite part of the base includes a tiered, bail-receiving groove structure for permitting the base to engage wheel rims of differing dimensions. The bail can be engaged in one of the bail-receiving grooves of the tiered structure, while the lever is rotated around the pivot of the other portion of the base in order to cam the bail into the bail-receiving groove as the lever pivots to lock the two parts of the base in place with respect to one another.

Other objects, advantages and applications of the present invention will become apparent to those skilled in the art when the following description of the best mode contemplated for practicing the invention is read in conjunction with the accompanying drawings.

BRIEF DESCRIPTION OF THE DRAWINGS

The description herein makes reference to the accompanying drawings wherein like reference numerals refer to like parts throughout the several views, and wherein.

DESCRIPTION OF THE PREFERRED EMBODIMENT

Figure 1:
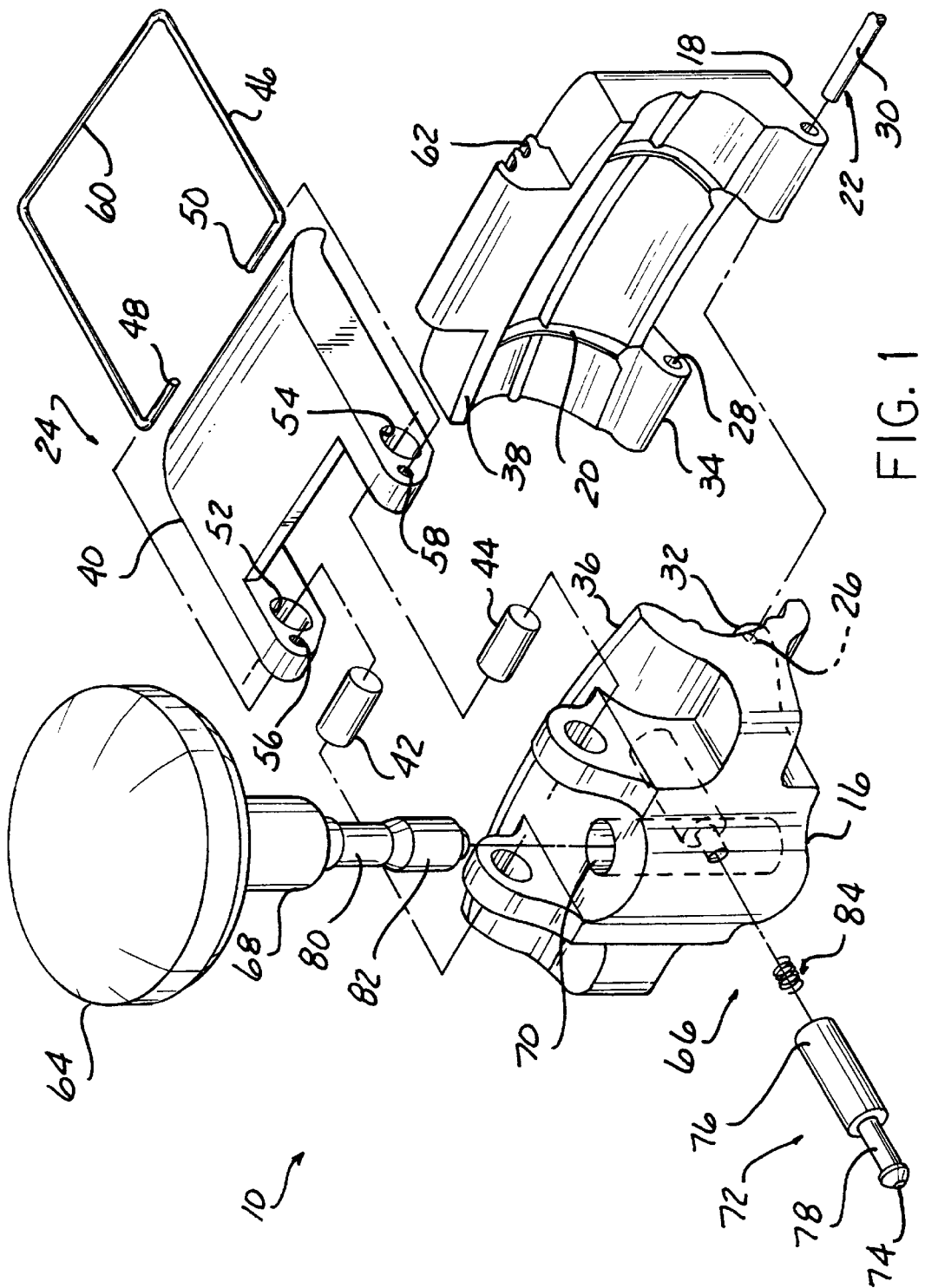
FIG. 1 is an exploded perspective view of a steering wheel and grip or knob according to the present invention with certain portions not shown, removed, or relocated for clarity purposes.

An apparatus 10 according to the present invention is connectible to a steering wheel 12 (shown in phantom in FIG. 4) for aiding disabled drivers. Base means 14 is provided having a first part 16 and a second part 18 for moving with respect to one another. The base means 14 defines a steering-wheel-receiving aperture 20 extending between the first and second parts, 16 and 18, for allowing the base means 14 to substantially sheath a portion of the steering wheel 12. Hinge means 22 is provided for pivoting the first and second parts, 16 and 18, of the base means 14 with respect to one another. The hinge means 22 is formed along a portion of the first and second parts, 16 and 18, for allowing placement of the base means 14 with respect to the steering wheel 12. Latch means 24 releasably retains the first and second parts, 16 and 18, of the base means 14 with respect to one another when positioned to substantially sheath a portion of the steering wheel 12.

The hinge means 22 can include a living hinge extending along one common edge of the first part 16 and second part 18 of the base means 14. Alternatively, hinge means 22 can be formed by apertures 26 and 28 formed in the first part 16 and second part 18 respectively of the base means 14. The aperture 26 and 28 are capable of being positioned in coaxial relationship with one another along a common edge between the first part 16 and the second part 18 for receiving a pivot pin 30 extending therethrough allowing the first part 16 and second part 18 to move with respect to one another about the pivot pin. Hinge means 22 extends along the common edges 32 and 34 of the first part 16 and second part 18 respectively to define a "clam shell" configuration allowing the base means 14 to be engaged about the steering wheel with the outer edges 36 and 38 of the first part 16 and second part 18 respectively opposing one another on an opposite side of the steering wheel from the hinge means 22.

Figure 3:
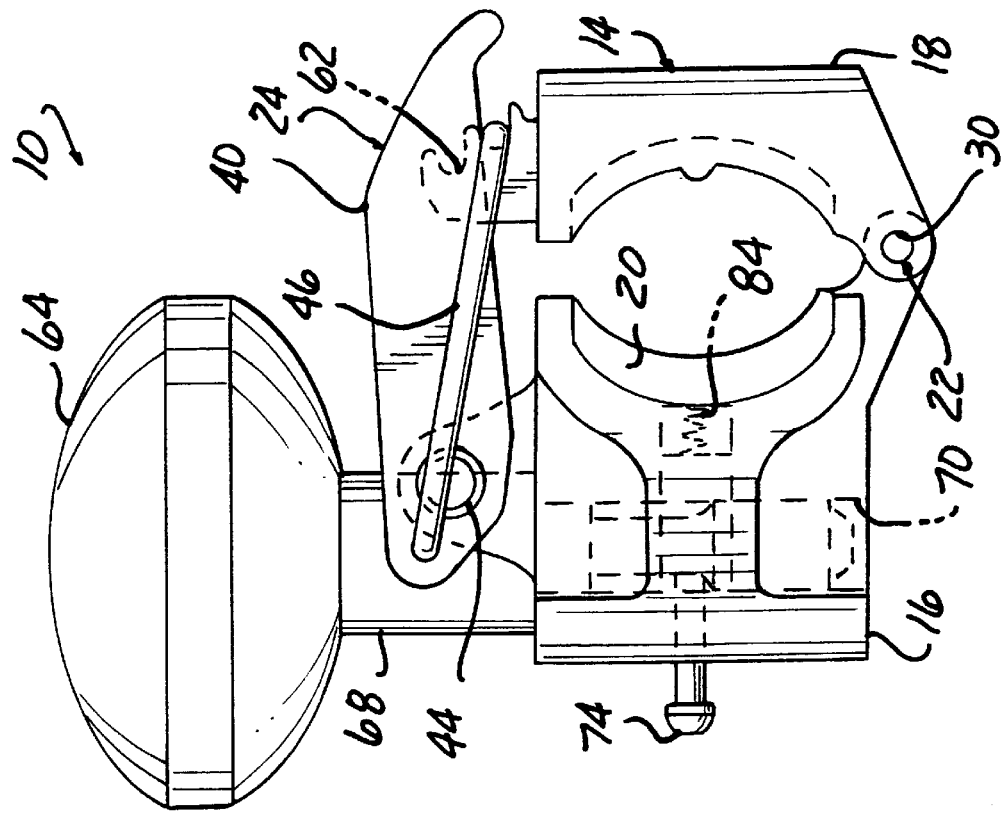
FIG. 3 is an end elevational view of the steering wheel grip or knob according to the present invention as illustrated in FIG. 1 and 2.
Figure 2:
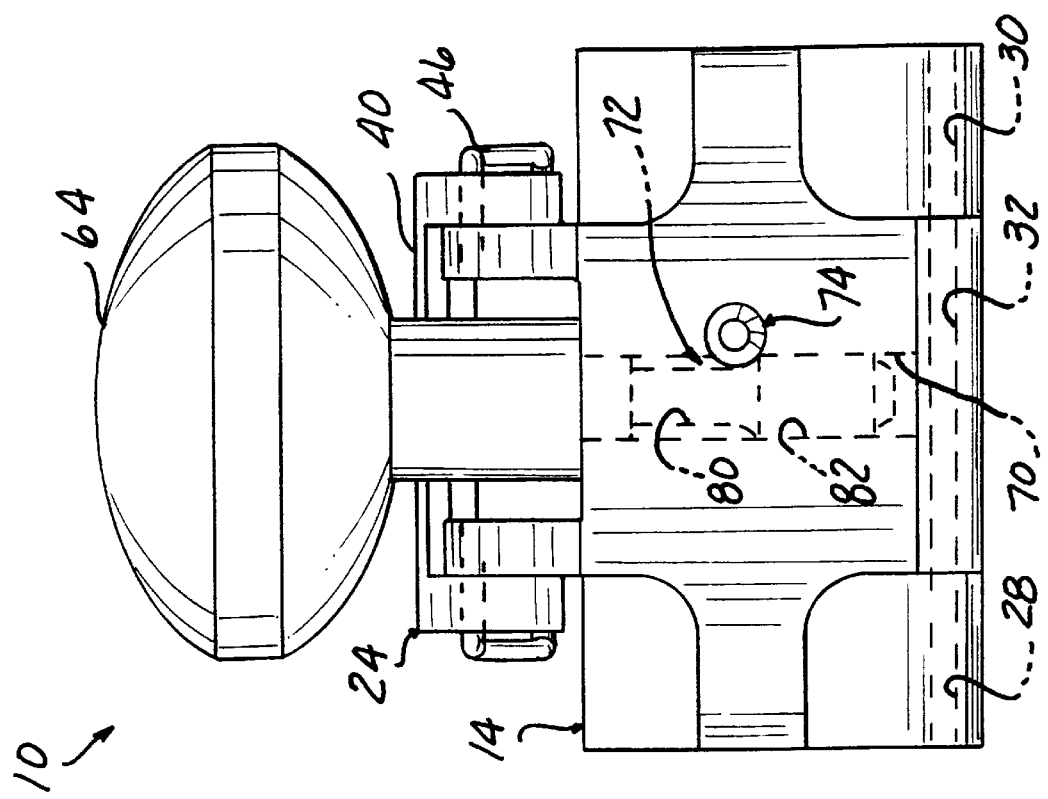
FIG. 2 is a side elevational view of the steering wheel grip or knob of FIG. 1 according to the present inventions.

Latch means 24 is pivotally connected to one of the first and second parts 16, 18 of the base means 14 and releasably connected to the other of the first and second parts 16, 18. As illustrated in the accompanying drawings, the latch means 24 can include a pivotable handle 40 rotatably connected to the first part 16 of the base means 14 by first and second pivot pins 42, 44. A tension strap or bail 46 is connected at opposite ends 48, 50 to the handle 40. The handle 40 may include a first aperture 52 and a second aperture 54 engageable with the first and second pivot pins 42 and 44 respectively for allowing pivotal movement of the handle 40 with respect to the first part 16 of the base means 14. First and second bail-receiving apertures 56, 58 can be formed in the handle 40 for receiving the opposite ends 48, 50 respectively of the tension strap or bail 46. Preferably, the bail 46 is moveable with respect to the handle 40 and rotation of the handle 40 about the first and second pivot pins 42, 44 create a camming action to draw an outer end 60 of the tension strap or bail 46 toward the first part 16 when connected to the second part 18 as the handle 40 is rotated about the first and second pivot pins 42, 44 (clockwise as illustrated in FIG. 3). At least one bail-receiving groove 62, or a tiered structure having a plurality of bail-receiving grooves, is formed adjacent the outer opposing edge 38 of the second part 18 of the base means 14 for operably engaging with the outer end 60 of the bail 46. When the handle 40 is in the latched position illustrated in FIG. 3, the first part 16 and second part 18 of the base means are held firmly gripping the steering wheel as a result of the camming action of the handle 40 on the bail 46 engaged within the bail-receiving groove 26 to hold the outer opposing edges 36 and 38 with respect to one another and preventing releasing movement of the first and second parts 16 and 18 with respect to one another about the pivot pin 30. Rotation of the handle 40 counter-clockwise about the first and second pivot pins 42, 44 in the illustration of FIG. 3, releases the camming action on the bail 46 allowing the bail 46 to be removed from the bail-receiving groove 62, and further allowing relative movement about the pivot pin 30 between the first part 16 and the second part 18 to remove the base means 14 from the steering wheel.

A hand grip or knob 64 is connected to the base means 14 for gripping by a driver with one hand for controlling movement of the steering wheel when the apparatus 10 is attached to the steering wheel 12. Connecting means 66 releasably connects the knob 64 to the base means 14. The connecting means 66 can include an outwardly extending stem 68 connected to the knob 64, and the base means 14 having an aperture 70 form therein complementary to the stem 68 for releasably receiving the stem 68 within the aperture 70. Stem-retaining means 72 releasably locks the stem 68 within the aperture 70 of the base means 14. The stem-retaining means 72 can include a locking member 74 having a first enlarged periphery 76 for locking interference fit with respect to the stem 68 when in a first position, and a second reduced periphery 78 of the locking member 74 for providing sufficient clearance for removal of the stem 68 from the aperture 70. The stem 68 can include a reduced peripheral portion 80 and an enlarged peripheral portion 82 operably engagable with the first enlarged periphery 66 of the locking member 74 for maintaining the stem 68 in a locked position within the aperture 70 when the locking member 74 is in the first position illustrated in FIG. 3. Biasing means 84 can be provided for urging the locking member 74 normally toward the first position. Preferably, the knob 64 and stem 68 are formed integral with one another, but are rotatable within the aperture 70 formed in the base means 14 even when locked against removal by the locking member 74.

Figure 4:
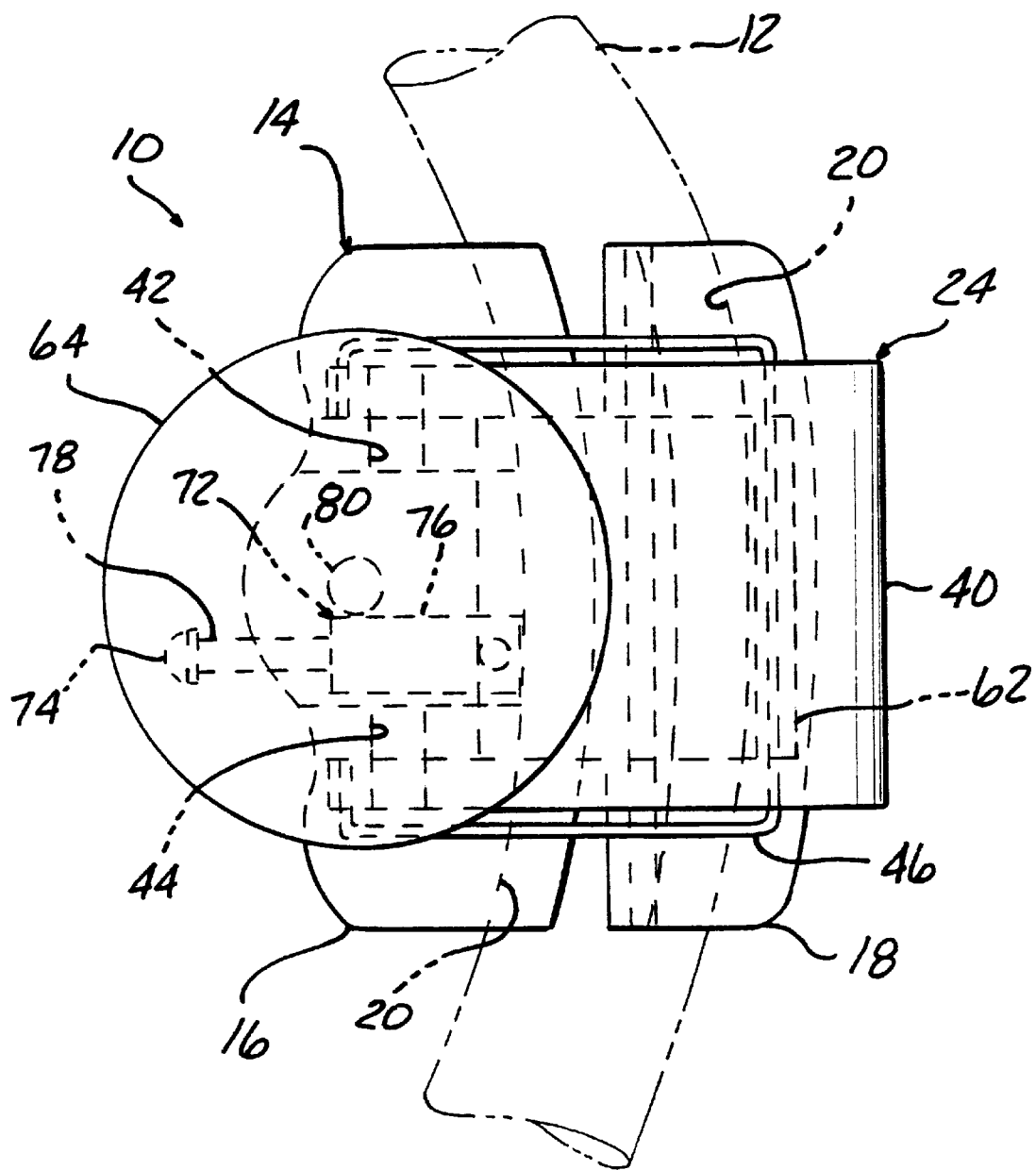
FIG. 4 is a plan view of the steering wheel grip or knob according to the present invention placed on a steering wheel rim shown in phantom.

In the assembled condition illustrated in FIGS. 3 and 4, the apparatus 10 according to the present invention can be removed from the steering wheel 12 by first urging the locking member 74 into the second position against the urging of the biasing means 84 to allow removal of the stem 68 and connected knob 64 from the base means 14. Once the knob 64 has been removed, the handle 40 can be pivoted counter-clockwise about the first and second pivot pins 42, 44 releasing the tension from the bail 46 and allowing the removal of the bail 46 from the bail-receiving groove 62. Release of the bail 46 from the bail-receiving groove 62 allows relative movement of the first part 16 with a respect to the second part 18 about the pivot pin 30 allowing passage of the steering wheel 12 between the outer opposing edges 36, 38 to remove the apparatus 10 from the steering wheel 12.

Installation of the apparatus 10 onto a steering wheel 12 is performed in the reverse order of the steps described above. In particular, the steering wheel 12 is positioned between the first part 16 and second part 18 of the base means 14. The first and second parts, 16 and 18 of the base means are pivoted toward one another about the hinge means 22 until the base means 14 substantially sheaths a portion of the steering wheel 12. The outer end 60 of the bail 46 is positioned within the bail-receiving groove 62 and the handle 40 is rotated clockwise about the first and second pivot pins 42, 44 as illustrated in FIG. 3 to tension the bail 46 thereby drawing the outer opposing edges 36, 38 of the first part and the second part 16, 18 toward one another to tightly engage the outer periphery of the steering wheel 12. Once the handle 40 is in the latched or locked position illustrated in FIG. 3, the stem 68 of the knob 64 can be engaged within the aperture 70 of the base means 14. The locking member 74 can be moved against the urging of the biasing means 84 allowing passage of the enlarged peripheral portion 82 of the stem 68, and then the locking member 74 is released to return the locking member 74 to the first position engaging the reduced peripheral portion 80 of the stem 68 with the first enlarged periphery 76 of the locking member 74.

While the invention has been described in connection with what is presently considered to be the most practical and preferred embodiment, it is to be understood that the invention is not to be limited to the disclosed embodiments but, on the contrary, is intended to cover various modifications and equivalent arrangements included within the spirit and scope of the appended claims, which scope is to be accorded the broadest interpretation so as to encompass all such modifications and equivalent structures as is permitted under the law.

What is claimed is:

1. An apparatus connectible to a steering wheel for aiding disabled drivers comprising:

base means having first and second parts that are moveable with respect to one another, said base means defining a steering-wheel-receiving aperture between said first and second parts for allowing said base means to substantially sheath a portion of said steering wheel;

a knob connected to said base means for gripping by said driver with one hand for controlling movement of said steering wheel when attached thereto;

means for releasibly connecting said knob to said base means, said connecting means including an outwardly extending stem connected to said knob, said base means having an aperture formed therein complementary to said stem for releasibly receiving said stem within said aperture, and stem-retaining means for releasibly locking said stem within said aperture, said stem-retaining means including a locking member having a first enlarged periphery for locking interference fit with respect to said stem when in a first position and a second reduced periphery for providing sufficient clearance for removal of said stem from said aperture;

hinge means allowing pivotal movement between said first and second parts of said base means with respect to one another, said hinge means formed along a portion of said first and second parts to allow placement of said base means with respect to said steering wheel; and latch means for releasibly retaining said first and second parts of said base means with respect to one another.

2. The apparatus of claim 1 wherein said stem-retaining means further comprises:

biasing means for urging said locking member normally toward said first position.

3. The apparatus of claim 1 wherein said base means further comprises:

said first part having a steering-wheel-engaging surface formed thereon, a first aperture extending along one side of said steering-wheel-engaging surface defining a first pivot axis and a second aperture extending along an opposite side of said steering-wheel-engaging surface defining a second pivot axis, said first axis and said second pivot axis extending generally parallel with respect to one another.

4. The apparatus of claim 1 wherein said base means further comprises:

said second part having a steering-wheel-engaging surface formed thereon, an aperture extending along one side of said steering-wheel-engaging surface, and at least one groove formed extending along an opposite side of said steering-wheel-engaging surface.

5. The apparatus of claim 1 wherein said hinge means further comprises:

said first part having a first aperture extending along a portion of one side of said base means defining said hinge axis;

said second part having a second aperture extending along another portion of said one side of said base means such that said first and second apertures are positionable in coaxial relationship with one another; and an elongated pin extending through said coaxial first and second aperture portions.

6. An apparatus connectible to a steering wheel for aiding disabled drivers comprising:

base means having first and second parts that are moveable with respect to one another, said base means defining a steering-wheel-receiving aperture between said first and second parts for allowing said base means to substantially sheath a portion of said steering wheel;

hinge means allowing pivotal movement between said first and second parts of said base means with respect to one another, said hinge means formed along a portion of said first and second parts to allow placement of said base means with respect to said steering wheel; and latch means for releasibly retaining said first and second parts of said base means with respect to one another, wherein said latch means includes a handle pivotally connected to one of said first and second parts of said base means for movement between a latched position and a released position, at least one groove formed on the other of said first and second parts of said base means, and a tension member extending from said handle to engage within said groove, such that said tension member is tightened as said handle moves from said released position to said latched position to hold said first and second parts of said base means in position with respect to one another.

7. An apparatus connectible to a steering wheel for aiding disabled drivers comprising:

base means having first and second parts that are moveable with respect to one another, said base means defining a steering-wheel-receiving aperture between said first and second parts for allowing said base means to substantially sheath a portion of said steering wheel, said first part having a steering-wheel-engaging surface formed thereon, a first aperture extending along a portion of one side of said steering-wheel-engaging surface defining a first pivot axis and a second aperture extending along an opposite side of said steering-wheel-engaging surface defining a second pivot axis, said first axis and said second pivot axis extending generally parallel with respect to one another, said second part having a steering-wheel-engaging surface formed thereon, a third aperture extending along a portion of one side of said steering-wheel-engaging surface coaxial with said first axis, and at least one groove formed extending along an opposite side of said steering-wheel-engaging surface;

hinge means allowing pivotal movement between said first and second parts of said base means with respect to one another, said hinge means including a pin extending through said first and third apertures extending along said first and second parts of said base means to allow placement of said base means with respect to said steering wheel; and latch means for releasibly retaining said first and second parts of said base means with respect to one another, wherein said latch means includes a handle pivotally connected to one of said first and second parts of said base means for movement between a latched position and a released position, at least one groove formed on the other of said first and second parts of said base means, and a tension member extending from said handle to engage within said groove, such that said tension member is tightened as said handle moves from said released position to said latched position to hold said first and second parts of said base means in position with respect to one another.

8. The apparatus of claim 7 further comprising:

a knob connected to said base means for gripping by said driver with one hand for controlling movement of said steering wheel when attached thereto.

9. The apparatus of claim 8 further comprising:

means for releasibly connecting said knob to said base means.

10. The apparatus of claim 9 wherein said connecting means further comprises:

an outwardly extending stem connected to said knob;

said base means having an aperture formed therein complementary to said stem for releasibly receiving said stem within said aperture; and stem-retaining means for releasibly locking said stem within said aperture.

11. An apparatus connectible to a steering wheel for aiding disabled drivers comprising:

base means having first and second parts that are moveable with respect to one another, said base means defining a steering-wheel-receiving aperture between said first and second parts for allowing said base means to substantially sheath a portion of said steering wheel, said first part having a steering-wheel-engaging surface formed thereon, a first aperture extending along a portion of one side of said steering-wheel-engaging surface defining a first pivot axis and a second aperture extending along an opposite side of said steering-wheel-engaging surface defining a second pivot axis, said first axis and said second pivot axis extending generally parallel with respect to one another, said second part having a steering-wheel-engaging surface formed thereon, a third aperture extending along a portion of one side of said steering-wheel-engaging surface coaxial with said first axis, and at least one groove formed extending along an opposite side of said steering-wheel-engaging surface;

a knob connected to said base means for gripping by said driver with one hand for controlling movement of said steering wheel when attached thereto;

means for releasibly connecting said knob to said base means, wherein said connecting means includes an outwardly extending stem connected to said knob, said base means having an aperture formed therein complementary to said stem for releasibly receiving said stem within said aperture, and stem-retaining means for releasibly locking said stem within said aperture, wherein said stem-retaining means includes a locking member having a first enlarged periphery for locking interference fit with respect to said stem when in a first position and a second reduced periphery for providing sufficient clearance for removal of said stem from said aperture;

hinge means allowing pivotal movement between said first and second parts of said base means with respect to one another, said hinge means including a pin extending through said first and third apertures extending along said first and second parts of said base means to allow placement of said base means with respect to said steering wheel; and latch means for releasibly retaining said first and second parts of said base means with respect to one another.

12. The apparatus of claim 11 wherein said stem-retaining means further comprises:

biasing means for urging said locking member normally toward said first position.

13. An apparatus connectible to a steering wheel for aiding disabled drivers comprising:

base means having first and second parts that are moveable with respect to one another, said base means defining a steering-wheel-receiving aperture between said first and second parts for allowing said base means to substantially sheath a portion of said steering wheel;

a knob connected to said base means for gripping by said driver with one hand for controlling movement of said steering wheel when attached thereto;

hinge means allowing pivotal movement between said first and second parts of said base means with respect to one another, said hinge means formed along a portion of said first and second parts to allow placement of said base means with respect to said steering wheel; and latch means for releasibly retaining said first and second parts of said base means with respect to one another, wherein said latch means includes a handle pivotally connected to one of said first and second parts of said base means for movement between a latched position and a released position, at least one groove formed on the other of said first and second parts of said base means, and a tension member extending from said handle to engage within said groove, such that said tension member is tightened as said handle moves from said released position to said latched position to hold said first and second parts of said base means in position with respect to one another.

14. An apparatus connectible to a steering wheel for aiding disabled drivers comprising:

base means having first and second parts that are moveable with respect to one another, said base means defining a steering-wheel-receiving aperture between said first and second parts for allowing said base means to substantially sheath a portion of said steering wheel;

a knob having a stem engageable within an aperture formed in the base means;

stem-retaining means having a locking member with a first enlarged periphery for locking interference fit with respect to the stem of the knob;

hinge means allowing pivotal movement between said first and second parts of said base means with respect to one another, said hinge means formed along a portion of said first and second parts to allow placement of said base means with respect to said steering wheel; and latch means for releasibly retaining said first and second parts of said base means with respect to one another.

15. An apparatus connectible to a steering wheel for aiding disabled drivers comprising:

base means having first and second parts that are moveable with respect to one another, said base means defining a steering-wheel-receiving aperture between said first and second parts for allowing said base means to substantially sheath a portion of said steering wheel;

hinge means allowing pivotal movement between said first and second parts of said base means with respect to one another, said hinge means formed along a portion of said first and second parts to allow placement of said base means with respect to said steering wheel; and latch means for releasibly retaining said first and second parts of said base means with respect to one another, said latch means having a handle pivotally connected to one of said first and second parts of said base means and a tension member to extend into a groove on an outer surface of an opposing one of said first and second parts of said base means.

* * * * *